United States Patent [19]
Gierc et al.

[11] Patent Number: 6,155,375
[45] Date of Patent: Dec. 5, 2000

[54] BUSHING ASSEMBLY FOR A RACK AND PINION STEERING GEAR

[75] Inventors: Daniel B. Gierc, Shelby Township; John A. Pietraszewski, Berkley, both of Mich.

[73] Assignee: TRW Inc., Lyndhurst, Ohio

[21] Appl. No.: 09/271,960

[22] Filed: Mar. 18, 1999

[51] Int. Cl.$^7$ ..................................................... B62D 5/06
[52] U.S. Cl. ............................... 180/428; 384/16; 92/168; 277/585
[58] Field of Search ..................................... 180/427, 428; 277/549, 575, 572, 585, 586, 587; 92/168; 384/15, 16, 32, 903

[56] References Cited

U.S. PATENT DOCUMENTS

| | | | |
|---|---|---|---|
| 3,190,702 | 6/1965 | Flick | 384/16 |
| 3,559,540 | 2/1971 | Sheldon | 277/586 |
| 4,123,965 | 11/1978 | Brown et al. | 180/428 |
| 4,323,003 | 4/1982 | Clippard, III | 92/87 |
| 4,594,938 | 6/1986 | Shore | 92/82 |
| 4,721,175 | 1/1988 | Butler | 180/428 |
| 4,934,668 | 6/1990 | Vassmer | 277/575 |
| 5,181,581 | 1/1993 | Engler . | |
| 5,505,276 | 4/1996 | Luibrand | 180/428 |
| 5,709,283 | 1/1998 | Nief . | |
| 5,911,607 | 6/1999 | Lacko et al. | 277/585 |

FOREIGN PATENT DOCUMENTS

| 1151446 | 7/1963 | Germany | 180/144 |
|---|---|---|---|

*Primary Examiner*—Daniel G. DePumpo
*Attorney, Agent, or Firm*—Harolli, Sundheim, Covell, Tummino & Szabo L.L.P.

[57] ABSTRACT

A vehicle steering apparatus (10) comprises a rack (24) connectable with steerable vehicle wheels and a housing (20) partially enclosing the rack and defining a fluid chamber (50). The housing (20) includes an inner surface (30) and a radially extending end surface (36). An annular seal member (72) seals the fluid chamber (50). The seal member (72) encircles the rack (24) and extends between the rack and the inner surface (30). A bushing (70) encircles the rack (24) and is attachable to the housing (20). The bushing (70) includes a first portion (80) disposed between the rack (24) and the housing (20). The first portion (80) supports the seal member (72) and supports the rack (24) for sliding movement relative to the housing (20). The bushing (70) includes a second portion (82) having a first section (130) disposed between the rack (24) and the housing (20). The second portion (82) has a second section (132) extending beyond the end surface (36). A bellows member (200) encircles the rack (24) and encloses the second section (132). The bellows member (200) is connected to the second section (132).

9 Claims, 2 Drawing Sheets

//////6,155,375//////

BUSHING ASSEMBLY FOR A RACK AND PINION STEERING GEAR

TECHNICAL FIELD

The present invention relates to a rack and pinion power steering gear and, in particular, is directed to a bushing assembly for a rack and pinion power steering gear.

BACKGROUND OF THE INVENTION

A typical hydraulic rack and pinion power steering gear for a vehicle includes a rack which extends axially through a chamber inside a hydraulic cylinder. The ends of the rack project axially outwardly from the terminal ends of the hydraulic cylinder and are connected with steering linkage which connects to steerable vehicle wheels.

A piston is fixed to the rack within the chamber. Rotation of the vehicle steering wheel actuates a hydraulic valve and causes hydraulic fluid under pressure to act against the piston. The force exerted by the hydraulic fluid moves the piston within the chamber, causing the rack to move axially. The axial movement of the rack moves the steering linkage which, in turn, causes the steerable wheels to turn.

To prevent hydraulic fluid from flowing out of the chamber, it is necessary to seal the ends of the chamber through which the rack projects. It is also desirable to support the rack at least at one end of the chamber for axial movement within the chamber. Finally, it is common to enclose the ends of the chamber with bellows attached to the hydraulic cylinder to prevent the ingress of moisture, dirt, or other contaminant.

SUMMARY OF THE INVENTION

The present invention is a vehicle steering apparatus comprising a rack connectable with steerable vehicle wheels, the rack being movable in opposite directions for turning the steerable wheels in opposite directions, and a housing partially enclosing the rack and defining a fluid chamber. The housing includes an inner surface and a radially extending end surface. An annular seal member seals the fluid chamber. The seal member encircles the rack and extends between the rack and the inner surface of the housing. A bushing encircles the rack and is attachable to the housing. The bushing includes a first portion disposed between the rack and the inner surface of the housing. The first portion supports the seal member and supports the rack for sliding movement relative to the housing. The bushing includes a second portion fixedly attached to the first portion. The second portion has a first section disposed between the rack and the inner surface of the housing. The second portion has a second section extending beyond the end surface of the housing. A bellows member encircles the rack and encloses the second section of the second portion of the bushing. The bellows member is connected to the second section.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 3 is a view taken along line 3—3 in FIG. 2.

DESCRIPTION OF A PREFERRED EMBODIMENT

Figure 1:
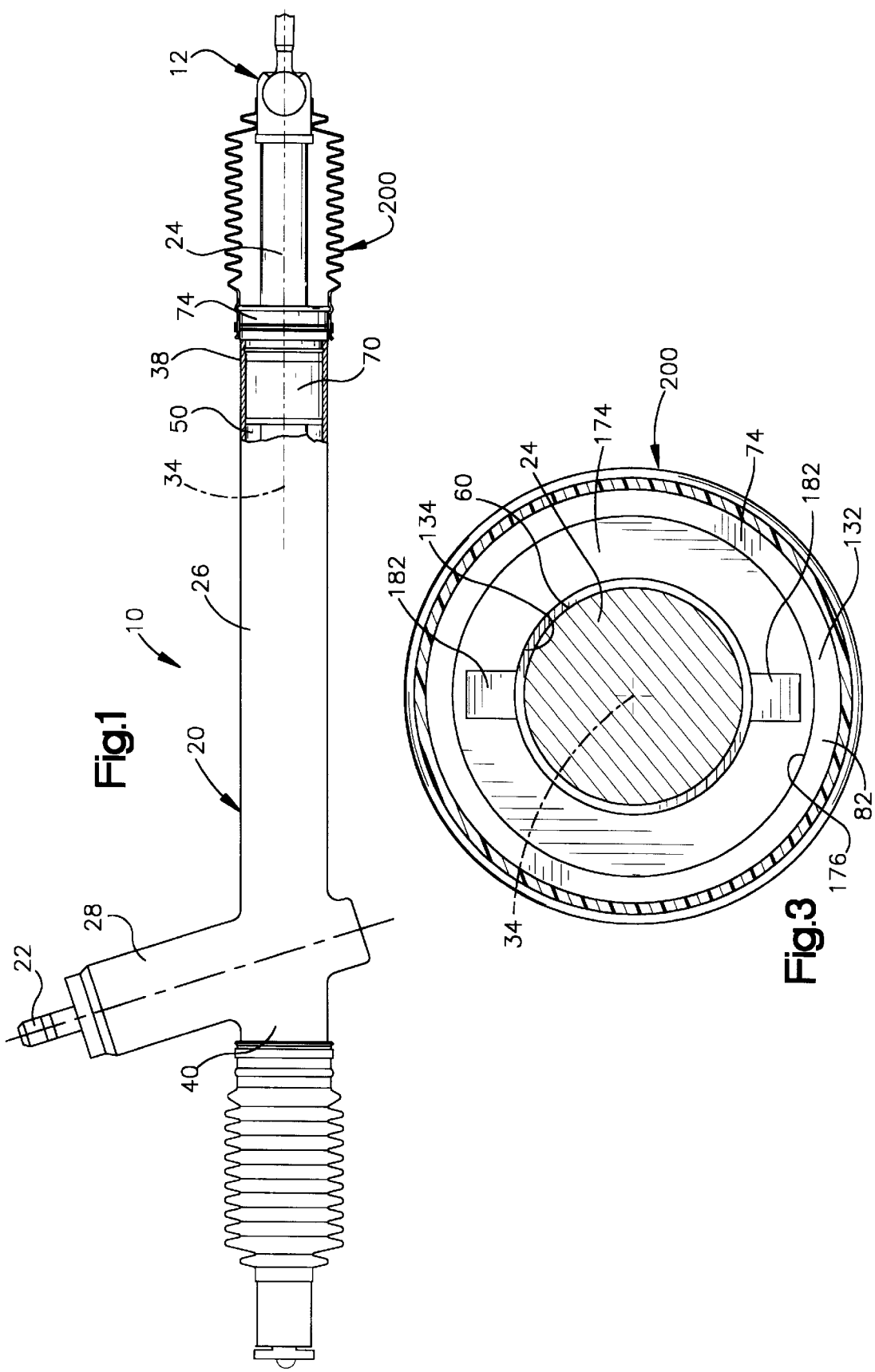
FIG. 1 is a schematic view of a rack and pinion power steering gear for a vehicle.

The present invention relates to a rack and pinion power steering gear and, in particular, is directed to a bushing assembly for a rack and pinion power steering gear. The present invention is applicable to various steering gear constructions. As representative of the present invention, FIG. 1 illustrates a rack and pinion power steering gear 10. The steering gear 10 is connected with a pair of steerable vehicle wheels (not shown) in a known manner by steering linkage 12 at one end of the steering gear and by similar steering linkage (not shown) at the other end of the steering gear.

The steering gear 10 includes a housing 20, a pinion 22, and a rack 24. The housing 20 includes a rack portion 26 and a transversely extending pinion portion 28. The pinion 22 is disposed in the pinion portion 28 of the housing 20 and has teeth (not shown) which meshingly engage teeth (not shown) on the rack 24 inside the housing at the intersection of the pinion portion and the rack portion 26.

Figure 2:
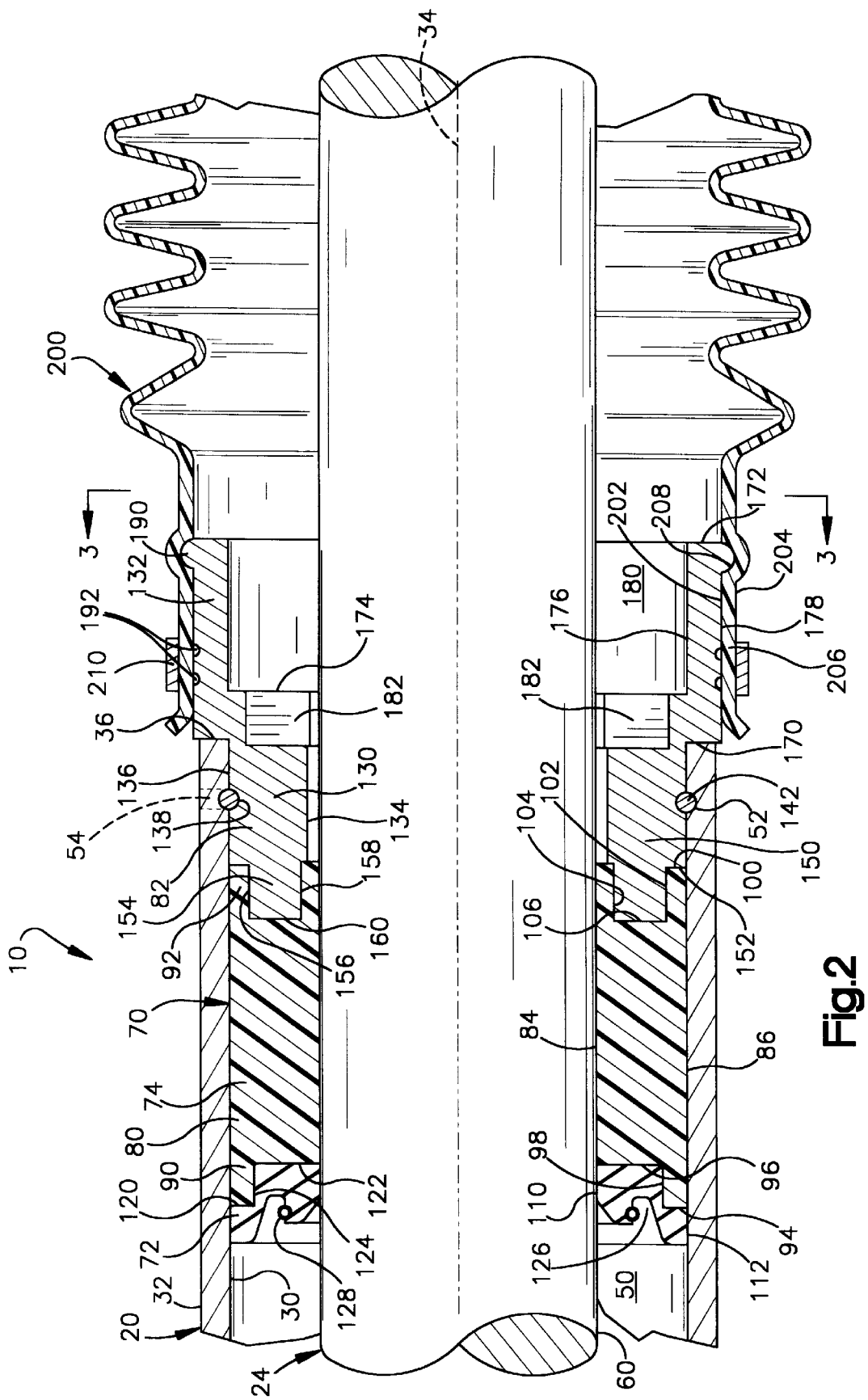
FIG. 2 is an enlarged sectional view of a portion of the power steering gear of FIG. 1 illustrating a bushing assembly constructed in accordance with the present invention.

The rack portion 26 of the housing 20 has cylindrical inner and outer surfaces 30 and 32, respectively, (FIG. 2) centered on an axis 34. A radially extending end surface 36 extends between the inner and outer surfaces 30 and 32 at first and second terminal ends 38 and 40, respectively, (FIG. 1) of the rack portion 26 of the housing 20. The inner surface 30 in the rack portion 26 defines a fluid chamber 50 (FIG. 2) within the housing 20. The inner surface 30 includes an annular groove 52 located adjacent the radially extending end surface 36. A radial aperture 54 extends from the groove 52 to the outer surface 32.

The rack 24 is centered on the axis 34 and extends axially through the fluid chamber 50 in the housing 20. Oppositely disposed distal ends 56 and 58, respectively, of the rack 24 project axially beyond the terminal ends 38, 40 of the housing 20 and are connected to the steering linkages 12. The rack 24 includes a cylindrical outer surface 60.

A piston (not shown) is fixed to the rack 24 inside the fluid chamber 50. Upon rotation of the vehicle steering wheel (not shown), under pressure in the fluid chamber 50 acts against the piston, causing the rack 24 to move axially within the housing 20. Such axial movement of the rack 24 in opposite directions moves the steering linkages 12 in opposite directions, and thus turns the steerable wheels in opposite directions.

A bushing assembly 70 is located at the first terminal end 38 of the rack portion 26 of the housing 20. The bushing assembly 70 encircles the rack 24 and is centered on the axis 34. The bushing assembly 70 is connected to the housing 20 and supports the rack 24 for axial movement relative to the housing. The bushing assembly 70 comprises an annular seal member 72 and an annular bushing 74.

The bushing 74 includes a first portion 80 and a second portion 82 fixedly attached to the first portion. The first portion 80 of the bushing 74 is made of a plastic material, preferably a 45% glass-filled polyester such the 545 Rynite® brand polyester available from E.I. DuPont de Nemours & Co. The second portion 82 of the bushing 74 is made of a metallic material, such as a powdered metal, Zinc, or cast aluminum. The plastic first portion 80 of the bushing 74 is preferably injection molded to the second portion 82 of the bushing 74 to form a single part. Alternatively, the first and second portions 80 and 82 of the bushing 74 could be press or snap fit together to form a single part.

The first portion 80 of the bushing 74 is located in the fluid chamber 50 and extends between the rack 24 and the housing 20. The first portion 80 of the bushing 74 includes cylindrical inner and outer surfaces 84 and 86, respectively. The inner surface 84 in the first portion 80 of the bushing 74 engages the outer surface 60 of the rack 24 and supports the rack for sliding movement relative to the bushing. The outer surface 86 in the first portion 80 of the bushing 74 engages the inner surface 30 in the rack portion 26 of the housing 20.

The first portion 80 of the bushing 74 has an inboard end 90 and an outboard end 92. The inboard end 90 of the first portion 80 includes radially extending first and second surfaces 94 and 96, respectively, connected by an axially extending third surface 98. The second and third surfaces 96 and 98 together define an axial recess (not numbered) in the first portion 80 of the bushing 74.

The outboard end 92 of the first portion 80 of the bushing 74 includes a radially extending end surface 100 and an annular axial cavity (not numbered) formed in the end surface. The axial cavity is defined by parallel first and second cavity surfaces 102 and 104, respectively, connected by a third cavity surface 106.

The annular seal member 92 is attached to the inboard end 90 of the first portion 80 of the bushing 74 and seals the fluid chamber 50 in the rack portion 26 of the housing 20. The seal member 72 is preferably made of an elastomeric material, such as Viton® or hydrogenated Nitrile®. The seal member 72 includes cylindrical inner and outer surfaces 110 and 112, respectively. The outer surface 112 of the seal member 72 sealingly engages the inner surface 30 of the housing 20. The inner surface 110 of the seal member 72 sealingly engages the outer surface 60 of the rack 24, which is axially movable relative to the seal member.

The seal member 72 has first, second, and third surfaces 120, 122 and 124, respectively, which abut the first, second, and third surfaces 94, 96 and 98, respectively, in the inboard end 90 of the first portion 80 of the bushing 74. The seal member 72 is preferably pressed into the axial recess in the inboard end 90 of the first portion 80 of the bushing 74. The seal member 72 includes an annular groove 126 in which a metallic garter spring 128 is located. The garter spring 128 exerts a radially inward force on a portion of the seal member 72 to press the inner surface 110 of the seal member against the outer surface 60 of the rack 24.

The second portion 82 of the bushing 74 has first and second sections 130 and 132, respectively. The first and second sections 130 and 132 are formed together as one piece, meaning that the first and second sections are made of a single homogeneous material as a single unit, rather than as separate parts which are joined together.

The first section 130 of the second portion 82 of the bushing 74 is located in the fluid chamber 50 and extends between the rack 24 and the housing 20. The first section 130 of the second portion 82 includes cylindrical inner and outer surfaces 134 and 136, respectively. The inner surface 134 in the first section 130 is spaced radially from the outer surface 60 of the rack 24. The outer surface 136 in the first section 130 of the second portion 82 of the bushing 74 engages the inner surface 30 in the rack portion 26 of the housing 20.

The outer surface 136 in the first section 130 of the second portion 82 of the bushing 74 includes an annular groove 138 which faces toward and radially aligns with the annular groove 52 in the inner surface 30 of the housing 20. The annular grooves 52 and 138 in the housing 20 and the first section 130, respectively, together define an annular passage (not numbered) in the steering gear 10. A lock wire 142 is located in the annular passage and axially secures the bushing 74 in the fluid chamber 50 inside the housing 20. The lock wire 142 is fed into the annular passage by inserting an end (not shown) of the lock wire through the radial aperture 54 in the housing 20 and then rotating the bushing 74 until the lock wire extends circumferentially around the bushing. The lock wire 142 is then terminated and the radial aperture 54 is closed and sealed in a manner not shown.

The first section 130 of the second portion 82 of the bushing 74 includes an inboard end 150. The inboard end 150 of the first section 130 includes a radially extending end surface 152 and an annular axial projection 154 extending from the end surface. The axial projection 154 is defined by parallel first and second projection surfaces 156 and 158, respectively, connected by a projection end surface 160. The axial projection 154 is disposed in the axial cavity (not numbered) in the outboard end 92 of the first portion 80 of the bushing 74 such that the surfaces 156, 158 and 160 defining the projection 154 are adhered to the surfaces 102, 104 and 106, respectively, defining the axial cavity. The end surface 152 of the first section 130 of the second portion 82 of the bushing 74 is adhered to the end surface 100 at the outboard end 92 of the first portion 80 of the bushing.

The second section 132 of the second portion 82 of the bushing 74 projects axially beyond the end surface 36 of the housing 20. The second section 132 includes first and second end surfaces 170 and 172, respectively, and a radially extending rack stop surface 174. The second section 132 further includes cylindrical inner and outer surfaces 176 and 178, respectively. The first end surface 170 of the second section 132 extends from the outer surface 136 of the first section 130 of the second portion 82 of the bushing 74 to the outer surface 178 of the second section 132 of the second portion 82. The first end surface 170 abuts the end surface 36 of the housing 20. The second end surface 172 extends from the inner surface 176 of the second section 132 to the outer surface 178 of the second section.

The inner surface 176 in the second section 132 and the rack stop surface 174 together define an annular chamber 180 in the second section 132 of the second portion 82 of the bushing 74. When the steerable wheels are turned to a maximum limit in a particular direction, the steering linkage 12 is received in the annular chamber 180 and abuts the rack stop surface 174. A diametrically opposed pair of slots 182 (FIG. 3) are formed in the rack stop face 174 in the second section 132 in the second portion 82 of the bushing 74. The slots 182 extend axially from the rack stop face 174 toward the first section 130 of the second portion 82 of the bushing 74 and are designed to receive a tool (not shown) used to rotate the bushing during the installation of the lock wire 142.

The outer surface 178 in the second section 132 of the second portion 82 of the bushing 74 includes a circumferentially extending retaining ridge 190 (FIG. 2) adjacent the second end surface 172. The retaining ridge 190 has a semi-cylindrical shape in cross-section. The outer surface 178 in the second section 132 of the second portion 82 of the bushing 74 further includes a plurality of circumferentially extending grooves 192 adjacent the first end surface 170. Each of the grooves 192 has a semi-cylindrical shape in cross-section.

The steering gear 10 includes a bellows member 200 encircling the rack 24 and enclosing the second section 132 of the second portion 82 of the bushing 74. The bellows member 200 is made of a suitable flexible material such as rubber. The bellows member 200 is attached to the second section 132 of the second portion 82 of the bushing 74. The bellows member 200 has inner and outer surfaces 202 and 204, respectively, and an end portion 206. A circumferentially extending groove 208 is formed in the inner surface 202 of the bellows member 200 and receives the retaining ridge 190 on the outer surface 178 of the second section 132 of the second portion 82 of the bushing 74 to assist in securing the bellows member to the bushing.

A ring-shaped band clamp 210 encircles the end portion 206 of the bellows member 200. The band clamp 210 radially overlies the plurality of grooves 192 in the outer surface 178 of the second section 132 of the second portion 82 of the bushing 74. The band clamp 210 compresses the end portion 206 of the bellows member 200 into the grooves 192 to assist in securing the bellows member to the second portion 82 of the bushing 74. By attaching the bellows member 200 to the second section 132 of the second portion 82 of the bushing 74, the manufacture of the housing 20 is simplified because a bellows retention feature does not have to be incorporated at the terminal end 38 of the housing. Thus, the present invention provides a bushing assembly 70 which seals the fluid chamber 50, supports the rack 24 for sliding movement, and retains the bellows member 200.

From the above description of the invention, those skilled in the art will perceive improvements, changes and modifications. Such improvements, changes and modifications within the skill of the art are intended to be covered by the appended claims.

Having described the invention, we claim:

1. A vehicle steering apparatus comprising:
   a rack connectable with steerable vehicle wheels, said rack being movable in opposite directions for turning the steerable wheels in opposite directions;
   a housing partially enclosing said rack and defining a fluid chamber, said housing including an inner surface and a radially extending end surface;
   an annular seal member for sealing said fluid chamber, said seal member encircling said rack and extending between said rack and said inner surface of said housing;
   a bushing encircling said rack and attachable to said housing, said bushing including a first portion disposed between said rack and said inner surface of said housing, said first portion supporting said seal member and supporting said rack for sliding movement relative to said housing,
   said bushing including a second portion fixedly attached to said first portion, said second portion having a first section disposed between said rack and said inner surface of said housing, said second portion having a second section extending beyond said end surface of said housing; and
   a bellows member encircling said rack and enclosing said second section of said second portion of said bushing, said bellows member being connected to said second section.

2. The vehicle steering apparatus of claim 1 wherein said first and second sections of said second portion of said bushing are formed as one piece from a single homogeneous material.

3. The vehicle steering apparatus of claim 1 wherein said first portion of said bushing is made of a glass-filled plastic material.

4. The vehicle steering apparatus of claim 3 wherein said second portion of said bushing is made of a metallic material.

5. The vehicle steering apparatus of claim 1 wherein said inner surface of said housing includes an annular first groove and said second portion of said bushing has an outer surface including an annular second groove, said first and second grooves facing each other and radially aligning with each other to form an annular passage.

6. The vehicle steering apparatus of claim 5 further comprising a lock wire disposed in said annular passage for axially securing said bushing in said fluid chamber in said housing.

7. The vehicle steering apparatus of claim 1 wherein said second section of said second portion of said bushing has an outer surface which engages said bellows member, said outer surface including a circumferentially extending ridge and a plurality of circumferentially extending grooves.

8. The vehicle steering apparatus of claim 7 wherein said bellows member includes a circumferentially extending groove which receives said circumferentially extending ridge on said outer surface of said bushing to assist in securing said bellows member to said bushing.

9. The vehicle steering apparatus of claim 7 further comprising a ring-shaped clamp member encircling said bellows member, said clamp member radially overlying said plurality of grooves in said outer surface of said bushing and compressing said bellows member radially inward into said plurality of grooves to assist in securing said bellows member to said bushing.

* * * * *